United States Patent [19]

Platt et al.

[11] 4,151,523
[45] Apr. 24, 1979

[54] CLUTTER MAPPER LOGIC SYSTEM

[75] Inventors: Vernon H. Platt, Fullerton; Richard D. Wilmot, Buena Park, both of Calif.

[73] Assignee: Hughes Aircraft Company, Culver City, Calif.

[21] Appl. No.: 717,711

[22] Filed: Aug. 25, 1976

[51] Int. Cl.² ............................................. G01S 7/44
[52] U.S. Cl. ............................................. 343/5 DP
[58] Field of Search ...................... 343/5 DP, 5 VQ

[56] References Cited

U.S. PATENT DOCUMENTS

| | | | |
|---|---|---|---|
| 3,325,806 | 6/1967 | Wilmot et al. | 343/5 VQ |
| 3,716,859 | 2/1973 | Webb et al. | 343/5 DP X |
| 3,900,850 | 8/1975 | Ulman et al. | 343/5 DP X |
| 3,940,762 | 2/1976 | Ethington et al. | 343/5 VQ |

Primary Examiner—T. H. Tubbesing
Attorney, Agent, or Firm—W. H. MacAllister; M. E. Gerry

[57] ABSTRACT

A receiving antenna connected to a surveillance sensor feeding a target detector. The target detector provides multiple inputs of target reports, azimuth, range and scan count data into a clutter mapper circuit which in turn feeds a track-while-scan circuit feeding a CRT display. The clutter mapper circuit provides improved clutter detection in the presence of scintillating clutter conditions.

12 Claims, 4 Drawing Figures

4,151,523

CLUTTER MAPPER LOGIC SYSTEM

CROSS REFERENCE TO RELATED APPLICATION

An application entitled Tracking Feedback Clutter Mapper Control Device, by the same inventive entity, has been filed concurrently with this application, Ser. No. 717,712, filed Aug. 25, 1976, now U.S. Pat. No. 4,067,012.

BACKGROUND OF THE INVENTION

This invention is in the field of sensor systems and particularly in the area of improved clutter rejection techniques.

The prior art for rejecting stationary clutter was the automatic clutter mapper described in U.S. Pat. No. 3,720,942. This automatic clutter mapper gave good clutter rejection performance for stationary clutter which occurred in a given automatic clutter mapper cell more than 25% of the time. Clutter was detected by incrementing an up-down counter by 4 with a detection, by one with a miss until a sufficiently large number of detections had been counted that the probability was very low that they could have occurred due to a moving target. At the time clutter was indicated, the clutter amplitude was measured and a threshold was set to reject the clutter.

Although foregoing stated technique worked well for rejecting clutter in a normal radar propagation environment, it allowed several times the specified clutter false alarm rate in a severe ducting environment (when radar propagation is not straight line but trapped by unusual atmospheric conditions).

SUMMARY OF THE INVENTION

The statistical hit evaluation logic automatic clutter mapper has two features which enable it to perform better than the original automatic clutter mapper with scintillating clutter due to ducting. The first feature is that the statistical hit evaluation logic automatic clutter mapper detects clutter by counting the elapsed time between detections instead of the number of detections. This allows clutter to be identified with only two detections versus a typical value of 8 to 12 detections for the original automatic clutter mapper.

Thus, the statistical hit evaluation logic is much more effective in rejecting clutter with a low blip to scan ratio.

The second feature is that the clutter amplitude is smoothed (averaged) to obtain a more accurate estimate of the fluctuating clutter amplitude so that the clutter rejection threshold can be set more accurately. The resulting performance is the consequence of evaluations using recordings of actual radar data. The results show the statistical hit evaluation logic automatic clutter mapper has about ⅓ as many false alarms as the original automatic clutter mapper.

DETAILED DESCRIPTION

Figure 1:
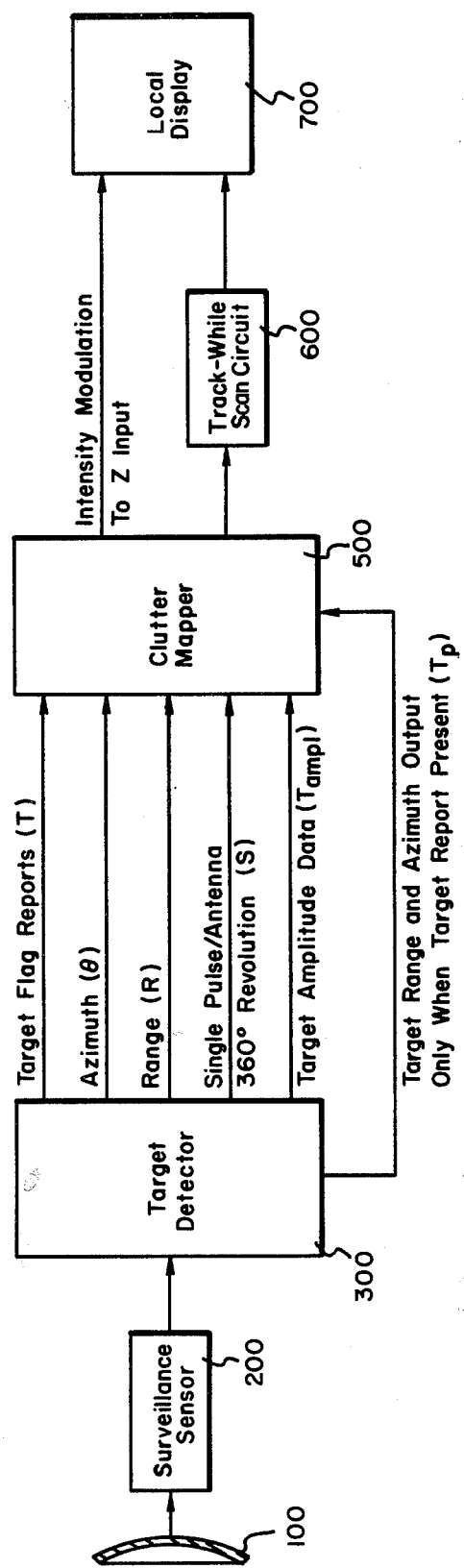
FIG. 1 is a schematic diagram of a surveillance system including such portions comprising the inventive aspects of the system.

Referring to FIG. 1, an energy sensing system is shown in block format with the principal elements therein.

Generally these sensing systems are exemplified by surveillance radars although sonar, optical, radar or other electromagnetic frequencies can be used. The surveillance radar at the head end of the system is shown in terms of an antenna 100, the output of which is electrically connected to the surveillance sensor 200. The output of surveillance sensor 200 feeds the input of target detector 300.

Exemplary of the output of detector 300 are outputs such as target report flag (T), target amplitude ($T_{AMPL}$), target azimuth angle data ($\theta$), position in range and azimuth (Tp) which is an output from target detector 300 feeding clutter mapper circuit 500 only when target reports are present, a pulse indicating each complete scan (S) of the surveillance sensor and the range and azimuth counts. Such outputs are fed to clutter mapper circuit 500, which comprises the combination that is the subject of this invention. Details of clutter mapper circuit 500 will be discussed hereinbelow in connection with FIG. 2.

The output of clutter mapper circuit 500 is fed to a track-while-scan circuit 600 the output of which is fed into the vertical deflection circuit of a local cathode ray display 700. The clutter mapper also feeds a signal into the Z axis inputs of cathode ray display circuit 700 to intensity modulate same.

Antenna 100, surveillance sensor 200, target detector 300, track-while-scan circuit 600 and cathode ray display circuit 700 are commonly known in the art. Such circuits may be found in various publications as follows:

Antenna 100 is shown in the textbook entitled "Introduction to Radar Systems," by Skolnik, at page 15, McGraw-Hill Book Company, New York, 1962 issue.

Sensor 200, a surveillance radar, is also shown in same textbook, in Chapter 8, pages 356–407.

Detector 300, is adequately described in U.S. Pat. No. 3,727,218.

Track-While-Scan circuit is illustrated and described in U.S. Pat. No. 3,603,994.

Although a cathode ray display as at 700 may utilize a conventional oscilloscope such as Tektronix 10 m.c. scope, this display is also shown and discussed in the above-mentioned Skolnik textbook at pages 391–395.

Figure 2:
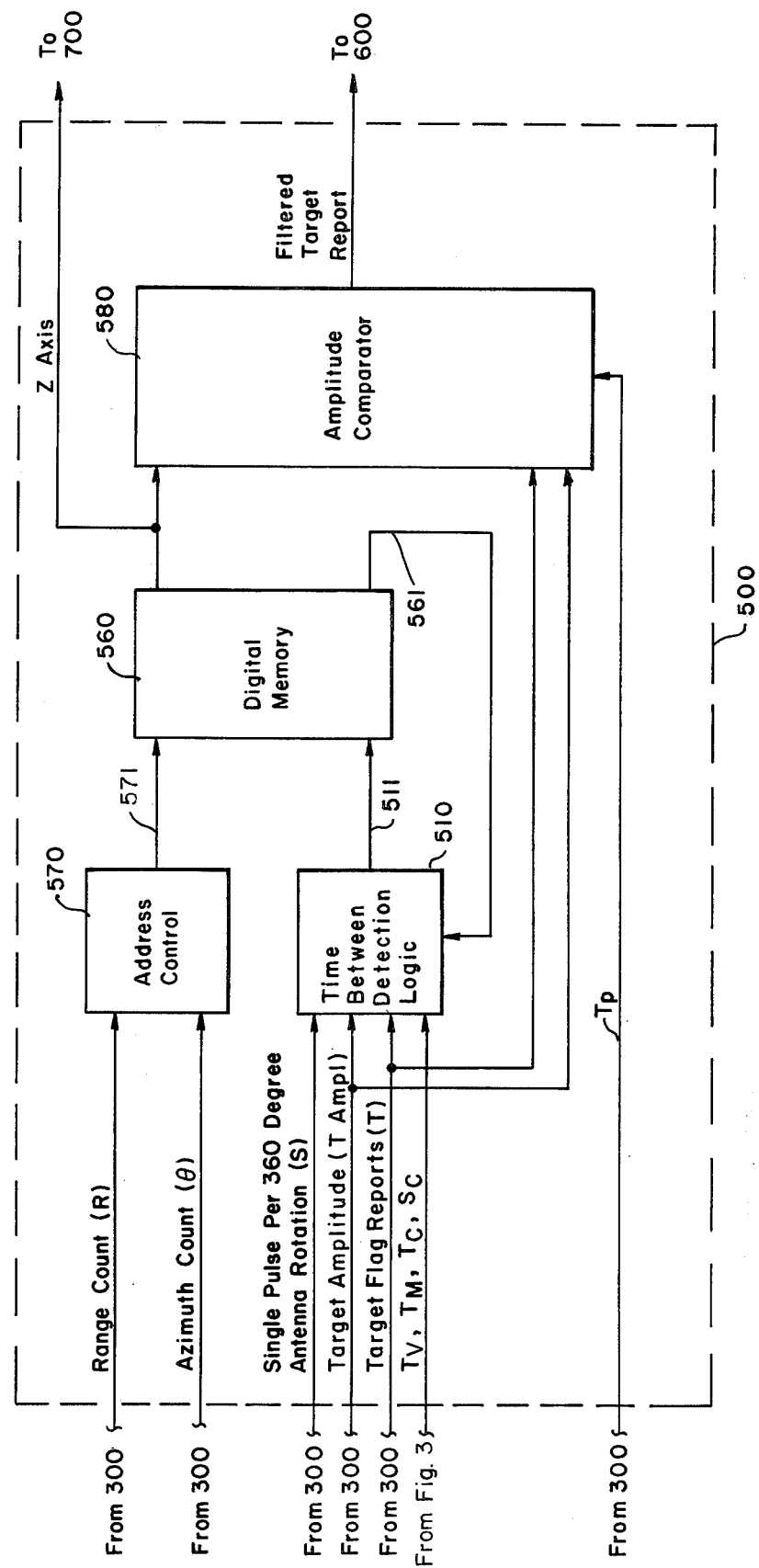
FIG. 2 is a schematic diagram of the clutter mapper circuit as shown in FIG. 1.

Additionally, such circuits comprising clutter mapper subsystem 500, excepting for logic circuit 510 thereof, are shown in detail in FIG. 2 are adequately described and illustrated in several U.S. patents. U.S. Pat. No. 3,940,762, FIG. 2 thereof shows such circuit. U.S. Pat. No. 3,325,806, FIG. 2 thereof also shows such circuit. U.S. Pat. No. 3,705,936, FIG. 1 thereof shows the clutter mapper comprising components 13, 14, 16, 18, 20, 24, 26, 28, 30, 31 and 32. Address control circuit 570, which is part of the clutter mapper circuit, is described in U.S. Pat. No. 3,940,762 as memory address timing control logic 26. Digital memory 560, also part of the clutter mapper is shown in U.S. Pat. No. 3,940,762 as memory 24 and memory decoder 26. The amplitude comparator 580 is so old in the art that references thereto are unnecessary. However, time-betweendetector-logic subsystem 510 is new and will be separately illustrated and discussed herein.

Referring to FIG. 2, the heart of the invention is clutter mapper 500.

The range count (R) and the azimuth count (θ) are both imputted into an address control circuit 570. The signals S, T, and $T_{AMPL}$ are fed into a time-between-detection logic circuit 510. Outputs of address control 570 and logic circuit 510 are used to feed a digital memory 560, as is commonly used in a conventional computer such as a magnetic core memory, a tape memory or the like. The memory 560 stores the time between detection counts, the control bits and the amplitude of detected clutter returns for each range-azimuth segment which is typically 2.8 by 4 miles. The output of digital memory 560 is fed back as an input into the time-between-detection-logic circuit 510. Likewise another output of the digital memory containing the clutter amplitude feeds the input of amplitude comparator 580. Also feeding the input to comparator 580 are the target signals T, $T_{AMPL}$, and $T_p$ coming from target detector 300. The output of digital memory 560 is used as the Z or intensity modulation signal applied to cathode ray display circuit 700 as mentioned above. The output of amplitude comparator provides filtered target reports which are used to feed the track-while-scan circuit 600 as discussed in the prior paragraph. The amplitude comparator discriminates between valid targets with amplitudes larger than the clutter amplitudes stored in memory in 560.

Figure 3:
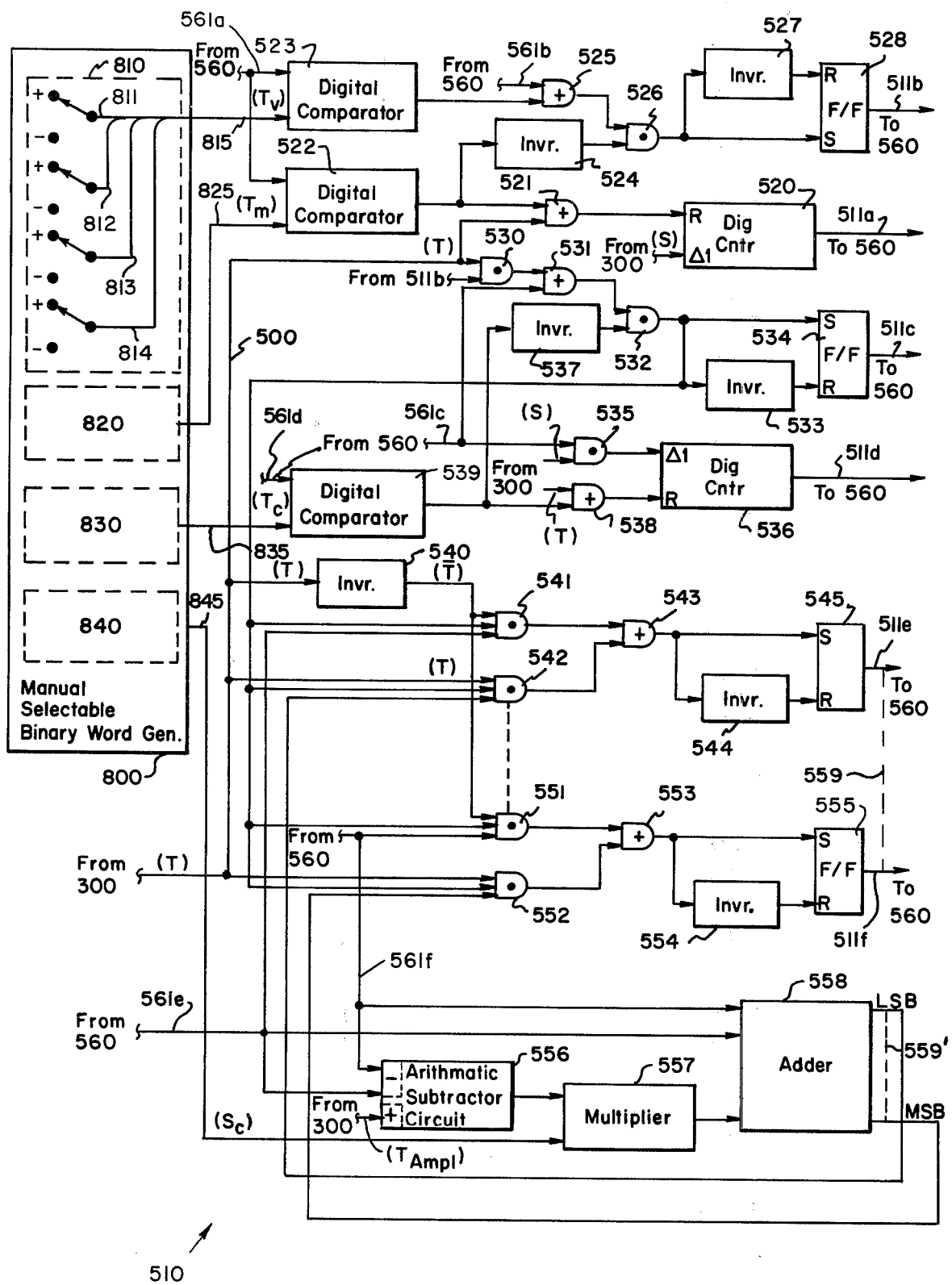
FIG. 3 comprises in schematic form the time between detection logic circuit and clutter amplitude smoothing as shown in FIG. 2, and a manually selectable binary word generator.

Details of the structural elements comprising the time-between-detection-logic circuit 510 are described in FIG. 3, inasmuch as this is a new circuit, not found in the prior art.

Figure 4:
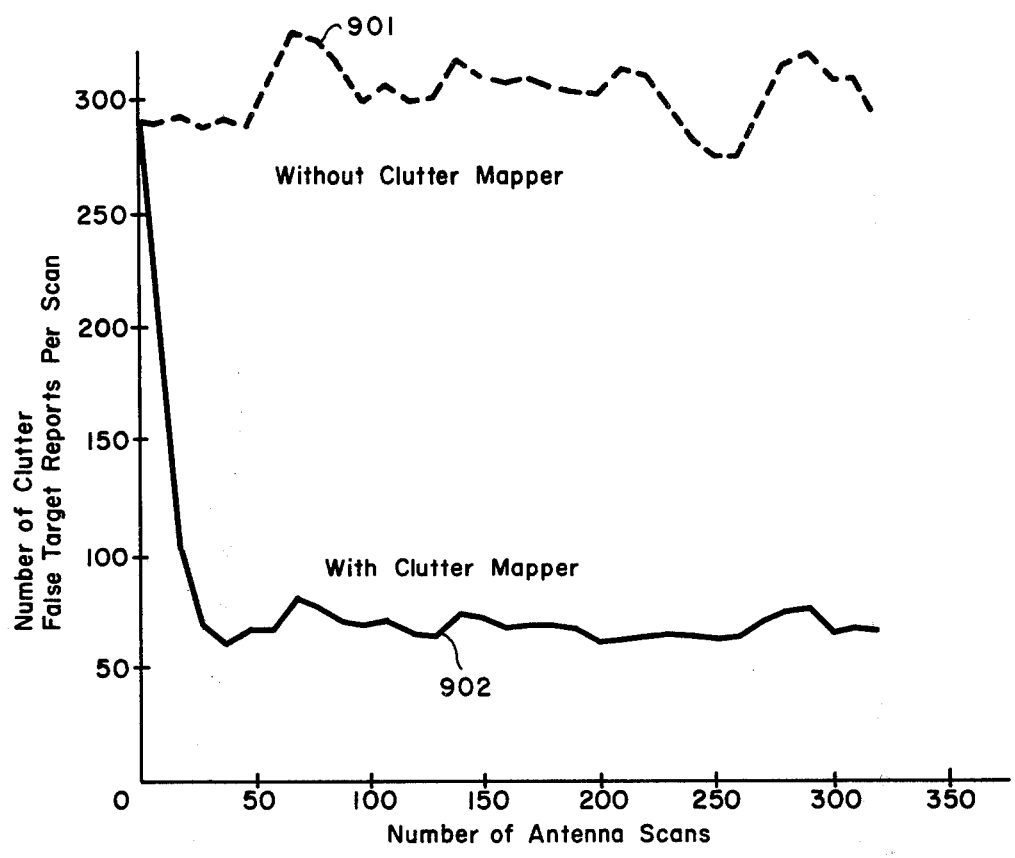
FIG. 4 shows the results obtained without and with the use of the inventive circuit of FIG. 3.

Referring therefore to FIGS. 3 and 4 as well as the prior figures, the principal functions are performed by circuit 500, which receives inputs from the target detector 300 of T, $T_{AMPL}$ and $T_p$, azimuth of receiving antenna (θ), range (R), and a single pulse for each 360 degree rotation of the receiving antenna (S), all as inputs from target detector 300 into clutter mapper 500, to be hereinbelow described.

Included as integral with circuit 500 is a manually selectable binary word generator at 800 which provides either true (+) or false (−) digits representing a series of outputs therefrom as inputs to time-betweem-detection logic 510 (FIG. 3 showing logic circuit 510). The outputs from circuit 810 therefore represents either true or false pulse a (binary ONE or binary ZERO) to in turn represent the first of the least significant bits (1st LSB) at 811, the second of the least significant bits (2nd LSB) at 812, the third of the least significant bits (3rd LSB) at 813, and the most significant bit (MSB) at 814. All the outputs from circuit 810, as above stated, are shown in shorthand notation as $T_v$ (target velocity) output and by a cable at 815 as a digital word input to circuit 510 of FIG. 3. Thus, for example, if it is desired to set $T_v$ so as to pass all targets in excess of 100 knots, the binary value 100 knots is set up by positioning the several switches in 810; all returns below 100 knots would be rejected as clutter.

In similar fashion as for circuit 810, circuit 820 puts out a digital word at cable 825 as input to circuit 510, designated as $T_m$ (maximum allowable sample time), for example, the binary word or equivalent of 50 scans of radar antenna 100. Therefore, every clutter map segment with more than 50 scans, since the prior return, would have its scan count reset to zero.

Similarly, circuit 830, represents the circuit in which the binary word representing $T_c$ (clutter erase threshold), for example, when the clutter erase threshold is set to provide an equivalent binary word of 30, all clutter mapper segments previously containing clutter but which have had no returns for the last 30 scans will erase the clutter information stored in that segment. Circuit 830 provides the present binary word at cable 835 as an input to circuit 510.

The smoothing constant $S_c$ circuit provides a binary word by means of a circuit in 840, similar to circuit 810, and an output at cable 845 as inputs to circuit 510. Constant $S_c$ requires the presetting of a binary word, for example, of numeric value of 0.25. This causes an average clutter amplitude value to be calculated based on 25% of the new clutter amplitude and 75% of the old clutter amplitude. It can be seen from FIG. 4 that without smoothing factor $S_c$, curve 901 results in substantial swings of clutter amplitude. However, smoothing curve 902 with inventive improvements shows the clutter swings at minimal values.

As preliminary to understanding the logic embodied in circuit 510, the following truth tables are exemplary of the non-exclusive OR gates utilized in combination with logic inverters and AND gates.

| | Truth Table for OR Gate 521 | |
|---|---|---|
| Input (T) | Input (From 522) | Output to Reset 520 |
| 0 | 0 | 0 |
| 0 | 1 | 1 |
| 1 | 0 | 1 |
| 1 | 1 | 1 |

| Truth Table for Combination of 524, 525 and 526 | | | | | |
|---|---|---|---|---|---|
| Input to 524 | Input to 525 from 523 | Input to 525 from 561b | Input to 526 from 524 | Input to 526 from 525 | Output from 526 |
| 0 | 0 | 0 | 1 | 0 | 0 |
| 0 | 1 | 0 | 1 | 1 | 1 |
| 1 | 0 | 1 | 0 | 1 | 0 |
| 1 | 1 | 0 | 0 | 1 | 0 |
| 1 | 1 | 1 | 0 | 1 | 0 |
| 1 | 0 | 0 | 0 | 0 | 0 |
| 0 | 1 | 1 | 1 | 1 | 1 |
| 0 | 0 | 1 | 1 | 1 | 1 |

It can be seen that truth tables combining gates 531, 532 and inverter 537 will give similar logic outputs from AND gate 532.

The basic requirement of this system, wherever calling for a non-exclusive OR gate, any true input will provide a true output, and that in all circumstances AND gates will have to have all true inputs to provide a true output.

Accordingly, as explained above, the time between detection logic 510, being part of circuit 500 is fed by circuit 800 whenever indicated by means of cables 815, 825, 835 and 845. Circuit 800 is manually set up to the desired binary word levels, as above explained and remains so set up until different values of $T_v$, $T_m$, $T_c$ or $S_c$ are desired. Those values indicated above are typical operating values.

In correlating FIG. 2 with FIG. 3 feedback input from memory 560 into circuit 510 is generally denoted as a cable 561 in FIG. 2, whereas individualized sets of wires in such cable are denoted specifically as 561a, 561b, 561c, 561d, 561e and 561f in FIG. 3. Likewise, output from circuit 510 is generally denoted by cable 511 feeding memory 560. Cable 511, however, consists of individualized sets of wires 511a, 511b, 511c, 511d, 511e and 511f which will be referred to in the hereinbelow discussion.

Also, to aid in understanding a slightly unconventional notation for the SET condition of digital counters 520 and 536, the notation used therefor in the counter representation is Δ1, which signifies that a single pulse provided by one revolutionary scan of antenna 100 provides the counter set function.

Hence, the S input from circuit 300 is provided to digital counter 520 to set the counter running upon a single 360 degree rotation of antenna 100.

A T signal is provided as input to OR gate 521, and output from digital comparator 522 is also provided as an input to OR gate 521. Either of these two OR gate inputs will provide a binary ONE output from OR gate 521 to RESET counter 520 and start its count anew. Counts as output binary logic pulses will therefore be provided by counter 520 at 511a to be fed as input to memory 560 and store same there.

Digital comparator 522 is fed by inputs at 561a and $T_m$, which comparator compares the signals inputted thereto to provide a logic ONE output. When such signal level amplitudes are the same, a true output is provided from comparator 522 as an input to OR gate 521.

Digital comparator 523 is fed by inputs at 561a and $T_v$, which comparator compares the signal amplitudes imputted thereto to provide an output logic ONE therefrom when amplitudes inputted are the same, as an input to OR gate 525. Another input to gate 525 is provided from 561b, so that when either input to gate 525 is true (ONE) its output is a logic ONE as an input to AND gate 526. AND gate 526 is fed through inverter 524 from output of comparator 522. Hence, when there is no logic output from comparator 522 (a binary ZERO), and a binary ONE output from OR gate 525, AND gate 526 will have two binary ONE inputs and will provide a true output therefrom. Conversely, when there is a true logic output from comparator 522, AND gate 526 will have a logical ZERO and ONE inputs and a logical ZERO output therefrom will result.

The foregoing discussion is shown in other combinations of outputs in the truth tables hereinabove, which is exemplary of similar gate and inverter combinations used in FIG. 3.

Hence, when a true output from AND gate 526 is present, flip-flop 528 will be set true and output from inverter 527 being ZERO will not act to reset flip-flop 528. The converse is true when the output from gate 526 is ZERO.

The output from flip-flop 528 will be fed by wire 511b to memory 560.

AND gate 530 is provided with one T input and one input from 511b. Hence, when both inputs are logical ONE's the gate output will be ONE. When either input thereto will be ZERO, there will be a ZERO output.

Output of gate 530 feeds OR gate 531. Also feeding OR gate 531 is an input from 561c. When either input to 531 is a logic ONE, a logic ONE input will be provided to AND gate 532. Only when both inputs to gate 531 are logic ZERO, then its output will be a logic ZERO feeding gate 532.

Digital comparator 539 is fed from 561d and from $T_c$, comparing these signals to provide an output of a logical ONE as an input to inverter 537 when the inputs are of equal value. When inverter 537 has a logic ZERO input, it provides a logic ONE output feeding gate 532. Hence, when both inputs to AND gate 532 are logical ONE's, there is an output therefrom of a logic ONE to set flip-flop 534 to its true position. The output from flip-flop 534 at 511c is fed to input of memory 560. When output from AND gate 532 is a logical ZERO, inverter 533 provides the requisite logical ONE input therefor to reset flip-flop 534.

Digital comparator 539, providing outputs therefrom as described above, also feeds OR gate 538, which OR gate also receives a T input thereto, so that when either input to gate 538 is a logical ONE, digital counter 536 is reset to normal start-to-count position. But counter 536 is also fed by AND gate 535, the output of which is connected to the set location of counter 536, denominated as Δ1, so that incrementing this counter by one will occur upon an input of one pulse thereto due to one 360 degree rotation of antenna 100. AND gate 535 is fed from memory 560 by means of feedback wire 561c and also from circuit 300 with an S type input. Hence digital counter 536 in its operative mode, when counting scans, will provide logical outputs at 511d as inputs to memory 560.

A T type input will also be provided to feed inverter 540 which in turn feeds AND gate 541. Also, feeding AND gate 541 is the logical output from AND gate 532 as well as a feedback logic signal from memory 560 by means of wires 561e. Similarly, AND gate 542 has a T input, an input from AND gate 532 by virtue of its output, and additionally an input logic signal representing the composite output from smoothing circuit 556-557-558 to provide the least significant bit information into AND gate 542. Only when all inputs to gate 542 are present will a logical ONE output therefrom provide an input to gate 543. Hence, either an output from AND gate 541 or from AND gate 542 or from both, will enable the output to be provided from non-exclusive OR gate 543 to set flip-flop 545 to its true condition. Conversely, when neither input to gate 543 is a logical ONE, a logic ZERO will be present at gate 543 output and hence inverter 544 will present a logic ONE to the reset position of flip-flop 545 to reset same. The output from flip-flop 545 is shown at 511e as an input into memory 560.

In similar fashion, an inverted T (or T̄) is provided as one input to AND gate 551. This gate also is fed by the output of AND gate 532, as well as by a feedback from memory 560 at 561f. AND gate 552 is fed by a T input, by an output from gate 532 and by an output of the most significant bit (MSB) from adder 558 of the smoothing circuit consisting of 556-557-558. Hence, when either or both AND gates 551 and 552 provide a logical ONE output therefrom (as in the case of AND gates 541 and 542), their nonexclusive OR gate 553 will provide a logical ONE output therefrom; otherwise gate 553 will provide a logical ZERO. When gate 553 provides a logical ONE output, flip-flop 555 will be set to its true position. Conversely, when gate 553 provides a logical ZERO output therefrom, inverter 554 will provide a logical ONE output to reset flip-flop 555. The output of flip-flop 555 is connected to an input of memory 560 at 511f.

Dotted line 559 is used to illustrate that a like number of circuits as terminate in flip-flops 545 and 555 are intended to be included, similarly connected, to provide outputs from like flip-flops sufficient to provide the requisite number of bits to comprise the binary words stored in memory 560.

Similarly, dotted line 559' is used to show that sufficient outputs from adder 558 are provided to the inputs of circuits implied by line 559' so that the requisite significant bits of binary information are provided.

The smoothing circuit, providing the smoothing shown in FIG. 4, has in part been discussed.

However, to complete the discussion, an arithmetic subtracting circuit 556 is fed from memory output 560 at 561e and 561f to its negative input in 556 which input also feeds adder 558. Digital information corresponding to the amplitude of T, denominated as $T_{AMPL}$, is fed from target detector 300 to the positive input of subtractor 556. Therefore, the negative inputs to circuit 556 are subtracted from the positive input thereto yielding an output signal from 556 which is fed into a conventional multiplier circuit 557. Circuit 557 is also fed by an input $S_c$ and muliplier 557 provides the product of $S_c$ and output signal amplitudes from subtractor 556. Such product output is fed to adder 558 which combining with the inputs from 561e and 561f provides the LSB through MSB output from adder 558 are heretofore described.

At the output of 510, the cable generally called out as 511, relay constituting individual wires denoted in FIG. 3 as 511a–511f, have digital signals thereon representing numbers which in turn represents the following:

At 511a the number thereat represents the numbers of scans that have elapsed since a target report occurred in this particular segment or any particular segment (of the 8000 segments present in the clutter map).

Similarly at 511b is a single bit whose TRUE state indicates that a valid target would have moved out of the particular segment. The signal is set TRUE after sufficient elapsed time to allow a valid moving target to leave the segment. Thus any target reports accuracy when 511b is TRUE are not due to a single valid moving target.

At 511c a TRUE level indicates that clutter has been detected, because the target report occurred when 511b was TRUE.

At 511d a digital word present indicates the number of scans that have elapsed since the least clutter report occurred in the instant segment. After sufficient number of scans have occurred with no clutter reports, as indicated by the number of scans equalling the threshold at 835 ($T_c$), after which the clutter is logically presumed to have faded. At this time the elapsed scan count is reset at 511c to ZERO, and clutter-detected-bit is reset to ZERO.

Outputs 511e through 511f represent the smooth target amplitude which are updated every scan by the target amplitude $T_{AMPL}$ signal and the digital smoothing circuits 556-557-558, and govern the threshold level.

The range bin of the last sweep of each segment is used for the timing control of control signals 511a–511d, so that new data can be written while the old data can be recirculated as shown in U.S. Pat. No. 3,325,806, while at 511e through 511f we update the smooth target report amplitude with each new target report.

Referring to FIG. 4 comparative performance characteristics are shown with and without clutter mapper circuit 500, therefore showing performance of the system with and without the invention.

It may be seen from this characteristic curve that more rejections per scan of clutter targets of the surveillance sensor are obtained due to indications of apparent targets, without the use of the inventive circuit as compared with its use. Such false results are due to the system, without the inventive circuitry, not being able to distinguish clutter from actual targets.

What is claimed is:

1. In an energy sensing system, the combination comprising:
    a time-between-detection-logic circuit;
    a digital memory circuit electrically connected to the output of the logic circuit;
    an amplitude comparator circuit the input of which is electrically connected to the output of the digital memory circuit; and
    a track-while-scan circuit the input of which is electrically connected to the output of the amplitude comparator.

2. The invention as stated in claim 1, including an address control circuit the output of which is electrically connected to the input of the memory circuit.

3. The invention as stated in claim 2, including a target detector electrically connected to the address control circuit.

4. The invention as stated in claim 3, including a surveillance sensor electrically connected to the target detector.

5. The invention as stated in claim 1, wherein the output of the digital memory circuit is electrically connected to the input of the logic circuit.

6. The invention as stated in claim 1, including a target detector the output of which is electrically connected to the input of the amplitude comparator.

7. The invention as stated in claim 6, including a surveillance sensor electrically connected to the target detector.

8. The invention as stated in claim 1, including a target detector electrically connected to the logic circuit.

9. The invention as stated in claim 8, including a surveillance sensor electrically connected to the target detector.

10. The invention as stated in claim 1, including a cathode ray display electrically connected to the track-while-scan circuit and the digital memory circuit.

11. The invention as stated in claim 1 including means, electrically connected to the time-between-detection-logic circuit, for averaging and smoothing clutter amplitudes present in received signals.

12. In an energy sensing system for sensing target velocity, the combination comprising:
    a target characterizing logic circuit, said logic circuit being characterized in terms of said target velocity;
    a digital memory circuit, devoid of shift registers, electrically connected to the output of the logic circuit; and
    an amplitude comparator circuit the input of which is electrically connected to the output of the digital memory circuit.

* * * * *